(12) United States Patent
Kim et al.

(10) Patent No.: US 8,464,361 B2
(45) Date of Patent: Jun. 11, 2013

(54) APPARATUS AND METHOD FOR RIGHT MANAGEMENT OF DIGITAL CONTENTS

(75) Inventors: Jaechul Kim, Daejeon (KR); Seongho Lee, Daejeon (KR); Yoonseop Chang, Daejeon (KR); Kyungok Kim, Daejeon (KR); Jonghyun Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 294 days.

(21) Appl. No.: 12/623,865

(22) Filed: Nov. 23, 2009

(65) Prior Publication Data

US 2010/0132045 A1  May 27, 2010

(30) Foreign Application Priority Data

Nov. 24, 2008 (KR) .................. 10-2008-0116974
Sep. 10, 2009 (KR) .................. 10-2009-0085419

(51) Int. Cl.
*G06F 7/04* (2006.01)
*G06F 17/30* (2006.01)
*H04N 7/16* (2006.01)

(52) U.S. Cl.
USPC ............................................. 726/28; 726/29

(58) Field of Classification Search
USPC ...................................................... 726/26–31
See application file for complete search history.

(56) References Cited

U.S. PATENT DOCUMENTS

| | | | |
|---|---|---|---|
| 2003/0014436 A1* | 1/2003 | Spencer et al. | 707/501.1 |
| 2003/0028490 A1* | 2/2003 | Miura et al. | 705/59 |
| 2003/0069904 A1* | 4/2003 | Hsu et al. | 707/204 |
| 2006/0059096 A1* | 3/2006 | Dublish et al. | 705/57 |
| 2007/0270139 A1* | 11/2007 | Jendbro et al. | 455/422.1 |
| 2007/0283420 A1 | 12/2007 | Rantalahti | |

FOREIGN PATENT DOCUMENTS

| | | |
|---|---|---|
| JP | 2001-325249 | 11/2001 |
| JP | 2002-108870 | 4/2002 |
| JP | 2006-510116 | 3/2006 |
| KR | 10-2007-0109789 | 11/2007 |
| KR | 10-2007-0117326 | 12/2007 |
| KR | 10-2008-0004202 | 1/2008 |
| WO | WO 2004/055645 A2 | 7/2004 |

OTHER PUBLICATIONS

Japanese Office Action dated Oct. 18, 2011 issued in corresponding Japanese Patent Application No. 2009-266135.

* cited by examiner

*Primary Examiner* — Philip Chea
*Assistant Examiner* — Trong Nguyen
(74) *Attorney, Agent, or Firm* — Staas & Halsey LLP

(57) ABSTRACT

An apparatus for right management of digital contents that includes a digital right manager that creates a usage right of digital contents on the basis of received right information; and a contents manager that provides the digital contents in accordance with the created usage right. The contents manager includes a contents packing unit that receives the usage right created from the digital right manager, and extracts and packages components of the digital contents in accordance with the usage right, and a contents providing unit that receives packaged digital contents created from the contents packing unit and provides the digital contents to a contents using device.

14 Claims, 8 Drawing Sheets

APPARATUS AND METHOD FOR RIGHT MANAGEMENT OF DIGITAL CONTENTS

RELATED APPLICATIONS

The present application claims priority to Korean Patent Application Serial Number 10-2008-116974, filed on Nov. 24, 2008 and Korean Patent Application Serial Number 10-2009-085419, filed on Sep. 10, 2009, the entirety of which are hereby incorporated by reference.

BACKGROUND OF THE INVENTION

1. Field of the Invention

The present invention relates to an apparatus and a method for access control and usage-right management of digital contents which should be differentially used in accordance with right information including a usage time, space, a user, etc., and more particularly, to a technology of improving compatibility of digital contents by issuing a usage right without limiting use of the digital contents and constructing a digital right management system for all or parts of the contents.

2. Description of the Related Art

With the development of wired/wireless communication means and the development of mobile communication means, digital contents businesses are also rapidly being developed. According to the developments, digital contents are also being used in various forms. Currently, research on a technology of facilitating management of the digital contents by allowing use of the digital contents at a predetermined time band, a technology of facilitating protection of copyright of the digital contents, etc. by allowing specific users to use the digital contents, a technology of facilitating protection of the digital contents by allowing use of the digital contents only in a predetermined space or domain, etc. are being conducted. That is, the technologies refer to the so-called digital right management (DRM) technology.

The research of the DRM technology is continuously progressing day by day. In particular, a space or time DRM technology is presently being researched. However, the existing DRM technology has a characteristic in that it is made through a method of limiting use of digital contents such as specific software, specific website, or a specific multimedia object, etc. in accordance with temporal and spatial information acquired from the outside.

However, the DRM technologies in the related art have the following problems. For example, numerous users should be examined in order to limit use of the contents and a problem in compatibility is indicated in order to apply the contents to DRM technologies managed in a plurality of other locations or times. Further, since only the DRM technology for the contents themselves is provided, a DRM technology for partial data of the contents for applying the DRM technology to a part of a map including information on military secrets, etc. in, for example, a DRM technology for the map is not provided. Therefore, the range of contents to which the DRM technology will be applied is limited, such as map contents, security contents, text contents, etc. which require application of the DRM technology to some components of the digital contents.

SUMMARY OF THE INVENTION

In order to solve the above-mentioned problems, there is an object of the present invention to facilitate management by a digital right manager by issuing a usage right for digital contents to a user instead of limiting use of the digital contents to which a DRM technology is applied and improve intercompatibility of various DRM contents by directly collecting the standard for the usage right by using a collecting device to collect a plurality of right-related information such as a time, a space, a user, etc. and packaging the digital contents while issuing the resultant usage right.

Further, there is another object of the present invention to use a DRM technology in a wider range by facilitating management of contents that should be intercepted due to security of predetermined contents through varying constituent components of digital contents which can be downloaded in one content in accordance with a usage right of the digital contents at the time of downloading the digital contents while enabling management of a right for parts of one digital contents while managing a right for all digital contents.

In order to achieve the above-mentioned object, an apparatus for right management of digital contents according to an aspect of the present invention includes a digital right manager that creates a usage right of digital contents on the basis of received right information; and a contents manager that provides the digital contents in accordance with the created usage right, wherein the contents manager includes a contents packing unit that receives the usage right created from the digital right manager, and extracts and packages components of the digital contents in accordance with the usage right, and a contents providing unit that receives packaged digital contents created from the contents packaging unit and provides the digital contents to a contents using device.

Further, a method for right management of digital contents according to another aspect of the present invention includes a digital right manager that creates a usage right of digital contents on the basis of received right information and a contents manager that provides the digital contents in accordance with the created usage right includes allowing the digital right manager to collect usage right information of the digital contents and create the usage right of the digital contents on the basis of the usage right information of the digital contents; and allowing the contents manager to extract and package components of the digital contents on the basis of the usage right and provide the packaged digital contents to a contents using device.

According to an embodiment of the present invention, an apparatus and a method for right management of digital contents can reduce the load of the right management apparatus and improve the compatibility of DRM target contents by issuing a usage right of contents through judgment in the digital contents right management apparatus and thus allowing use of all contents or some of the contents. Further, since right management for some of the contents becomes available, a DRM technology can be effectively applied even to digital contents requiring security management, which include navigation, web map, and text information, thereby extending the application range of the DRM technology.

DETAILED DESCRIPTION OF THE PREFERRED EMBODIMENTS

Hereinafter, referring to FIG. 1, a preferred embodiment of the present invention will be described.

Figure 1:
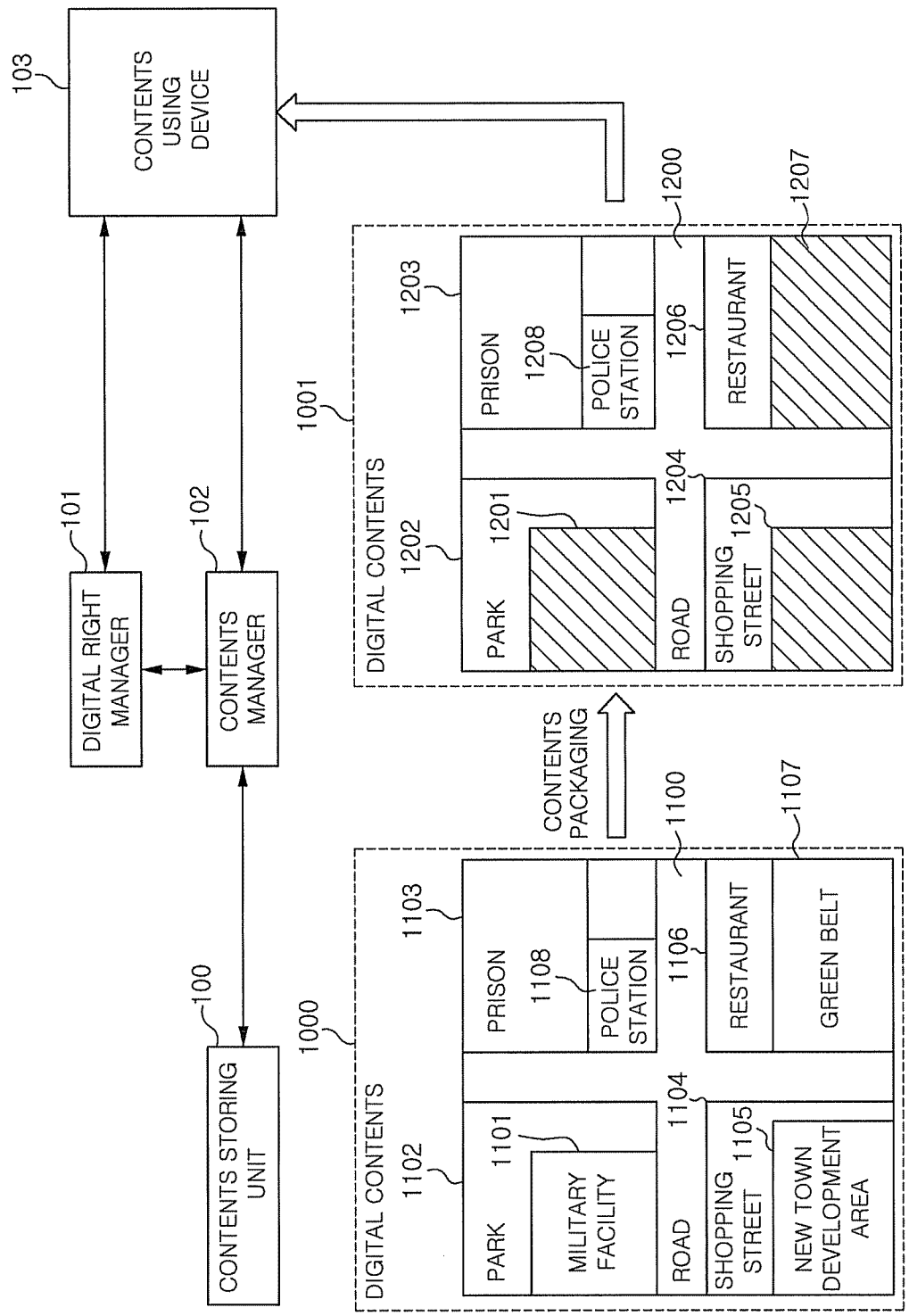
FIG. 1 shows a diagram of an apparatus for right management of digital contents according to an embodiment of the present invention and an example of digital contents packaging according to an embodiment of the present invention.

FIG. 1 shows a diagram of an apparatus for right management of digital contents according to an embodiment of the present invention and an example of digital contents packaging according to an embodiment of the present invention.

Referring to FIG. 1, the apparatus for right management of digital contents according to the embodiment of the present invention includes a contents manager 102 that packages (packaging means converting the digital contents into data by corresponding the right information and the digital contents so as to provide the digital contents, which is a target for digital right management, in accordance with the usage right) the digital contents by extracting components of contents in accordance with a usage right based on a plurality of right information on the digital content and provides the packaged digital contents to a contents using device 103 or a contents storing unit 100, a digital right manager 101 that issues and manages the usage right of the digital contents in accordance with a plurality of conditions on the basis of a request from the contents using device 103 or a request from the contents manager 102 and collects information on use right of a plurality of digital contents in order to issue the usage right of the digital contents, and the contents storing unit 100 that stores the packaged digital contents in the contents manager 102 in accordance with the usage right while providing the digital contents which is a packaging target to the contents manager 102 and provides the stored packaged digital contents in accordance with the request from the contents manager 102.

Further, referring to FIG. 1, an example of digital contents packaged by a right management system of the digital contents according to an embodiment of the present invention is shown. First, assuming that map image contents 1000 before being packaged is stored in the contents storing unit 100, the contents storing unit 100 provides the map image contents 1000 to the contents manager 102 by a request from the contents manager 102 and the contents manager 102 packages the received the map image contents 100 on the basis of information on a usage right for the map image contents 1000 received in the contents using device 103 and the digital right manager 101. Components such as a road 1100, a park 1102, a military facility 1101, a prison 1103, a police station 1108, a shopping street 1104, a restaurant 1106, a new town development area 1105, and a green belt 1106 are included in the map image contents 1000 before being packaged. In contrast, information on the military facility 1201, the new town development area 1205, and the green belt 1207 are deleted and not seen from the plurality of constituent components 1100, 1101, 1102, 1103, 1104, 1105, 1106, 1107, and 1108 constituting the map image contents 1000 before being packaged in the map image contents 1000 packaged by the contents manager. The packaged map image contents 1001 is stored in the contents storing unit 100 or provided according to a request from the contents using device 103.

The right information represents a plurality of information required to establish the usage right for the digital contents. The information on the usage right for the digital contents may include information on time (for each date or for each time), space (a geopolitical spatial space or domain space on a wired/wireless network), and a user (including a plurality of information on general status such as age, sex, job title, occupation, etc.). The right information may be independently or complexly used. For example, in the map image contents 1000 and 1001 of FIG. 1, the right information on the usage right to the packaged map image contents 1001 will be able to include information such as "5 hours from use permission, within a current administrative district, usable by all users", etc. The usage right is also converted into a data type in correspondence with the right information to be generated and provided.

An example of the digital contents includes map information contents in the embodiment of the present invention. The digital contents may also include various multimedia data such as text data, image data, moving picture data, audio data, etc. which can be generated by devices such as a general computer, a notebook, computers for a server, military, a government department, etc. for a special purpose, a portable multimedia player (PMP), a digital camera, a camcorder, a navigation device for a vehicle and other purposes, a (global positioning system (GPS) measurement and display device, an MP3 player, etc.

Further, the digital contents have different levels for use thereof in accordance with the usage right and components of the digital contents are classified in accordance with the levels for the use. In the embodiment of the present invention, the map information contents are provided as the digital contents and the components of the digital contents classified in accordance with the levels depending on the usage right are classified in accordance with characteristics of each terrain or building.

The contents using device 103 as a device for allowing the user to use the digital contents which are the management target of the digital right should download, generate, and edit the digital contents. Further, the contents using device 103 should be connected to the digital right manager and the contents manager through the wired/wireless communication network in order to request issuance of the usage right for the digital contents and receive the digital contents. Examples of the contents using device 103 include the general computer, notebook, the computers for the server, military, government department, etc. for a special purpose, the portable multimedia player (PMP), the digital camera, camcorder, the navigation device for the vehicle and for other purposes, the global positioning system (GPS) measurement and display device, the MP3 player, etc. connected to the wired/wireless communication network, which can generate, store, and edit the above-mentioned digital data.

The contents storing unit 100, as a device which receives and stores a plurality of digital contents which are the packaging target from external storage media or the wired/wireless communication network, receives and stores the packaged digital contents by extracting the components of the contents in the content manager 102 while providing the plurality of digital contents which the packaging target according to the request from the contents manager 102, and provides the packaged digital contents to the contents manager 102 according to a request of the contents manager 102 for providing the packaged digital contents based on the request of the contents using device 103, may be installed in the same system or device as the contents manager 102 and the digital right manager 101 or may be the computer for the server and other storage media connected to the wired/wireless communication network which can store the digital contents which are the packaging target or the digital contents packaged by the contents manager 102 as a database by using an external device, as described above.

Figure 2:
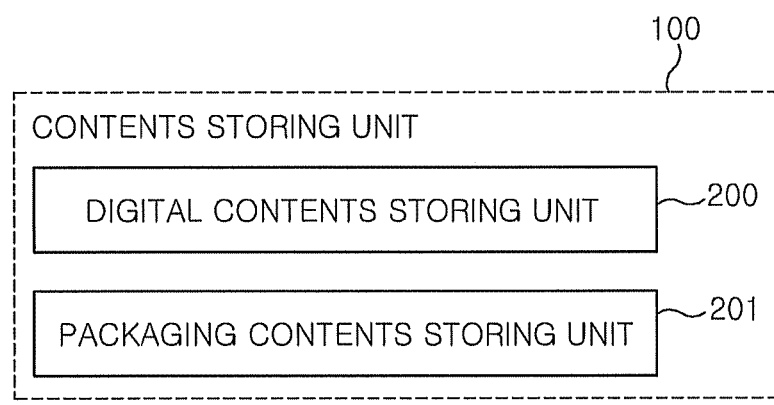
FIG. 2 shows an example of a configuration of a contents storing unit in an apparatus for right management of digital contents according to an embodiment of the present invention.

Further, referring to FIG. 2, in another embodiment of the present invention, the contents storing unit 100 separately stores the digital contents which are the packaging target and the digital contents packaged by the contents manager 102. The contents storing unit 100 may include a digital contents storing unit 200 storing the digital contents which are the packaging target and a packaging contents storing unit 201 storing the packaged digital contents.

The contents manager 102 and the digital right manager 101 may be the computer and other storage media connected to the wired/wireless communication network, such as the contents storing unit 103. In particular, the digital right manager 101 may further include a device that can store the usage right for the digital contents and may be connected to an external device that can collect usage right judgment information such as time, space, user information, etc.

Figure 3:
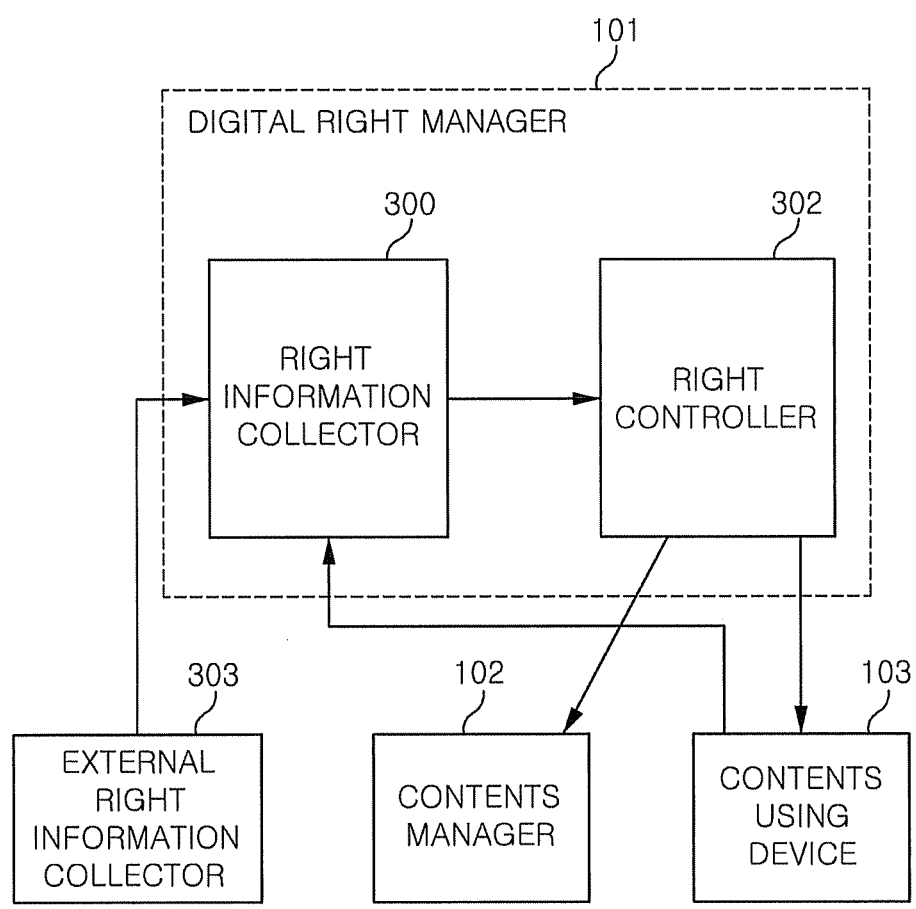
FIG. 3 shows an example of a configuration of a digital right manager in an apparatus for right management of digital contents according to an embodiment of the present invention.

FIG. 3 shows an example of a configuration of a digital right manager 101 in an apparatus for right management of digital contents according to an embodiment of the present invention.

Referring to FIG. 3, the digital right manager 101 includes a right information collector 300 that collects information on the time, the space, the user, etc. which is the information of the contents using device 103 according to the request of the contents using device 103 for issuing the usage right or the request of the contents manager 102 and a controller 302 that creates the usage right by taking charge of calculating the level (for example, in the digital map contents required for the navigation, a usage right for other map information is issued and a map information usage right for the military facility is not issued) of the usage right of the digital contents on the basis of the information on the usage right of the digital contents of the contents using device 103 collected in the right information collector 300, judges whether or not the usage right for the digital contents is already issued in the contents using device 103 by receiving the request for issuing the usage right of the digital contents with being connected with the contents using device and the contents manager 102 and transmits the issuing state, and issues the created usage right of the digital contents to the contents using device or transmits the usage right of the digital contents to the contents manager 102 according to the request of the contents manager 102. Further, an external digital right information collecting device 303 for providing judgment criterion information of the usage right of the digital contents for the contents using device 103 may be additionally connected to the digital right information collector 300. In addition, the contents using device 103 may be connected to the digital right information collector 300 in order to receive the right information directly from the contents using device 103.

The external digital right information collector 303 means an external device that can the usage right judgment information such as the time, space, user information, etc. as described above and may include all devices connected to the wired/wireless communication network, which can perform the function. The external digital right information collector 303 may include, for example, a timer that can perform digital time measurement, a camera that can measure a predetermined space as a position measuring device including a GPS device, a communication device such as an antenna, etc. connected to a GPS satellite, a database storage device that can acquire the user information or a data server computer of a government organization, etc.

Figure 4:
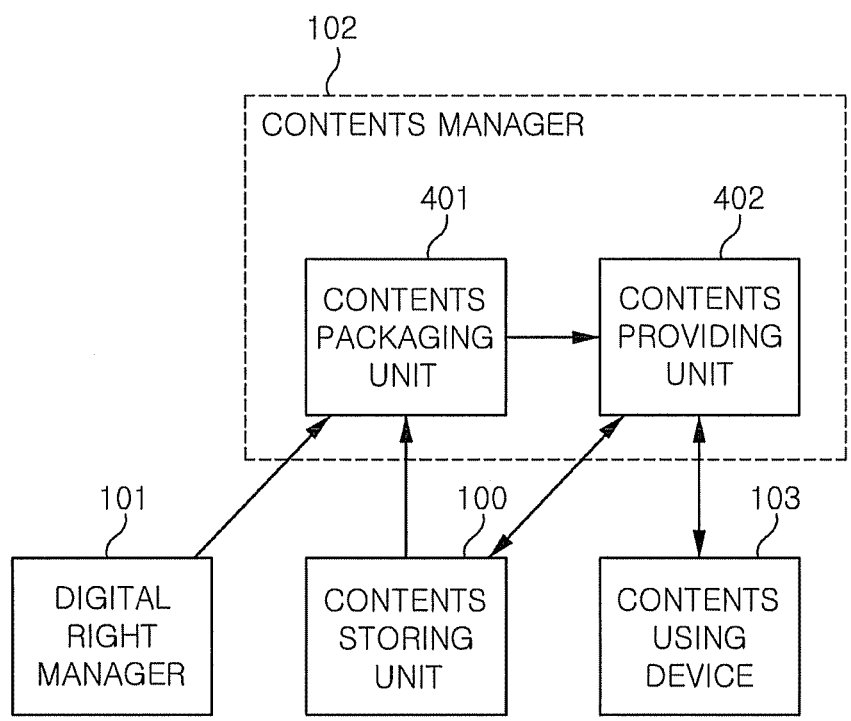
FIG. 4 shows an example of a configuration of a contents manager in an apparatus for right management of digital contents according to an embodiment of the present invention.

FIG. 4 is a diagram showing a schematic configuration of the contents manager 102 that has the most important characteristic in the present invention and takes charge of extracting, packaging, and providing the components of the digital contents on the basis of the usage right of the digital contents while being connected to the digital right manager 101, the contents storing unit 100, and the contents using device 103.

Referring to FIG. 4, the contents manager 102 may include a contents packaging unit 401 that extracts and packages the components of the digital contents in correspondence with the received right information by receiving the digital contents which is the packaging target from the contents storing unit 103 while requesting and receiving the usage right of the digital contents required for packaging the digital contents which is the packaging target and a contents providing unit 402 that receives the packaged digital contents from the contents packaging unit, filters and provides the packaged digital contents to the contents using device 103 in accordance with a predetermined condition according to the usage right, or filters and provides the packaged digital contents to the contents using device 103 according to the usage right by receiving the packaged digital contents stored in the contents storing unit 100. The predetermined condition includes a case in which the digital contents packaged in the contents packaging unit 401 are immediately provided to the contents using device 103 without being stored in the contents storing unit 100 or a case in which since the digital contents packaged in accordance with the usage right for the contents using device 103 are stored in the contents storing unit 100, the packaged digital contents need not to be provided.

In the configuration of the contents manager 102, the contents providing unit 402 may be incorporated in the contents storing unit 100 depending on the embodiment, the contents providing unit 402 may not exist in the case where a packaging pattern of the digital contents stored in the contents storing unit 100 is packaged in the state where all or some of the digital contents are filtered depending on a database of the already accumulated usage right, and the contents storing unit 100 and the contents using device 103 may be connected to each other.

Further, it is preferable that the contents providing unit 402 further includes a means for judging whether or not an appropriate usage right corresponding to the packaged digital contents is issued in addition to a communication means for downloading the contents on the basis of the usage right issued in the contents using device according to the request of the contents using device 103 while simply transferring the contents for efficient execution of the present invention.

In another embodiment of the present invention, the contents providing unit 402 may further include a means for judging whether or not requested digital contents are already provided to the contents using device 103 when the contents using device 103 requests downloading the digital contents in order to efficiently execute the present invention in addition to the function of providing the contents and judging whether or not the usage right is issued. Since the digital contents can be arbitrarily transmitted as a general rule, the digital contents an be transmitted from the contents using device 103 that receives the packaged digital contents from the contents providing unit 402 through downloading, to another device. Thereafter, when the usage right is issued in the digital right manager 101 at the time when another device requests using the transmitted packaged digital contents, the packaged digital contents need not to be provided from the contents providing unit 402. Therefore, the contents providing unit 402 is provided with a means for judging whether or not the packaged digital contents which is the usage request target are already provided by receiving and analyzing the request of the contents using device 103. In this case, when the packaged digital contents as the usage request target are already present in the contents using device 103, the contents providing unit 402 does not provide the packaged digital contents and the contents using device uses the usage right for using the already downloaded packaged digital contents. Further, it is possible to perform a control of deleting some components from or providing some components to the packaged digital contents in accordance with the usage right issued in the contents using device 103.

Figure 5:
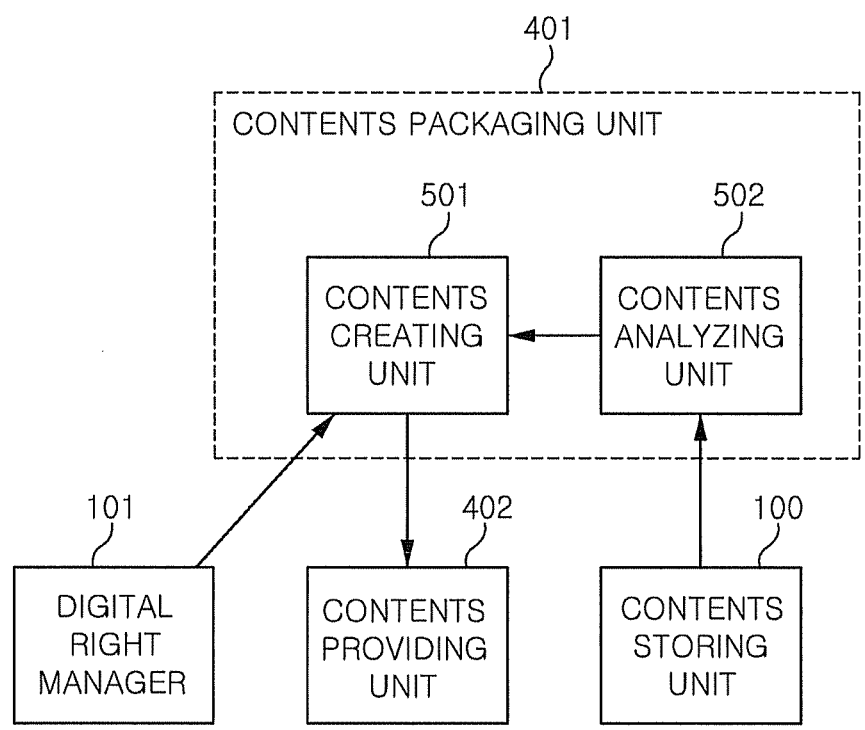
FIG. 5 shows an example of a configuration of a contents packaging unit included in a contents manager in an apparatus for right management of digital contents according to an embodiment of the present invention.

In the present invention, a schematic device diagram of a contents packaging unit 401 that packages the digital contents on the basis of the digital contents and the usage right is shown in FIG. 5.

Referring to FIG. 5, the contents packaging unit 401 includes a contents analyzing unit 502 that performs a preparation job for creating the packaged digital contents by analyzing components of the digital contents by analyzing digital contents data which is the packaging target and the contents creating unit 501 that receives data of the usage right of the digital contents from the right information receiving unit 400 to analyze and convert the usage right data into data for packing the digital contents, receives the digital contents from the contents analyzing unit 502 and extracts and packages components of the digital contents corresponding to the usage right of the digital contents to create the packaged digital contents and transfer the packaged digital contents to the contents providing unit 402.

The contents creating unit 501 may directly combine the usage right information with the data of the digital contents or package the digital contents by marking a code on the data with respect to the usage right information. In addition to the method, all types will be available in which the contents providing unit 402 recognizes the usage right for the digital contents and the digital contents corresponding to the usage right and selectively provides to the contents using device 103.

Figure 6:
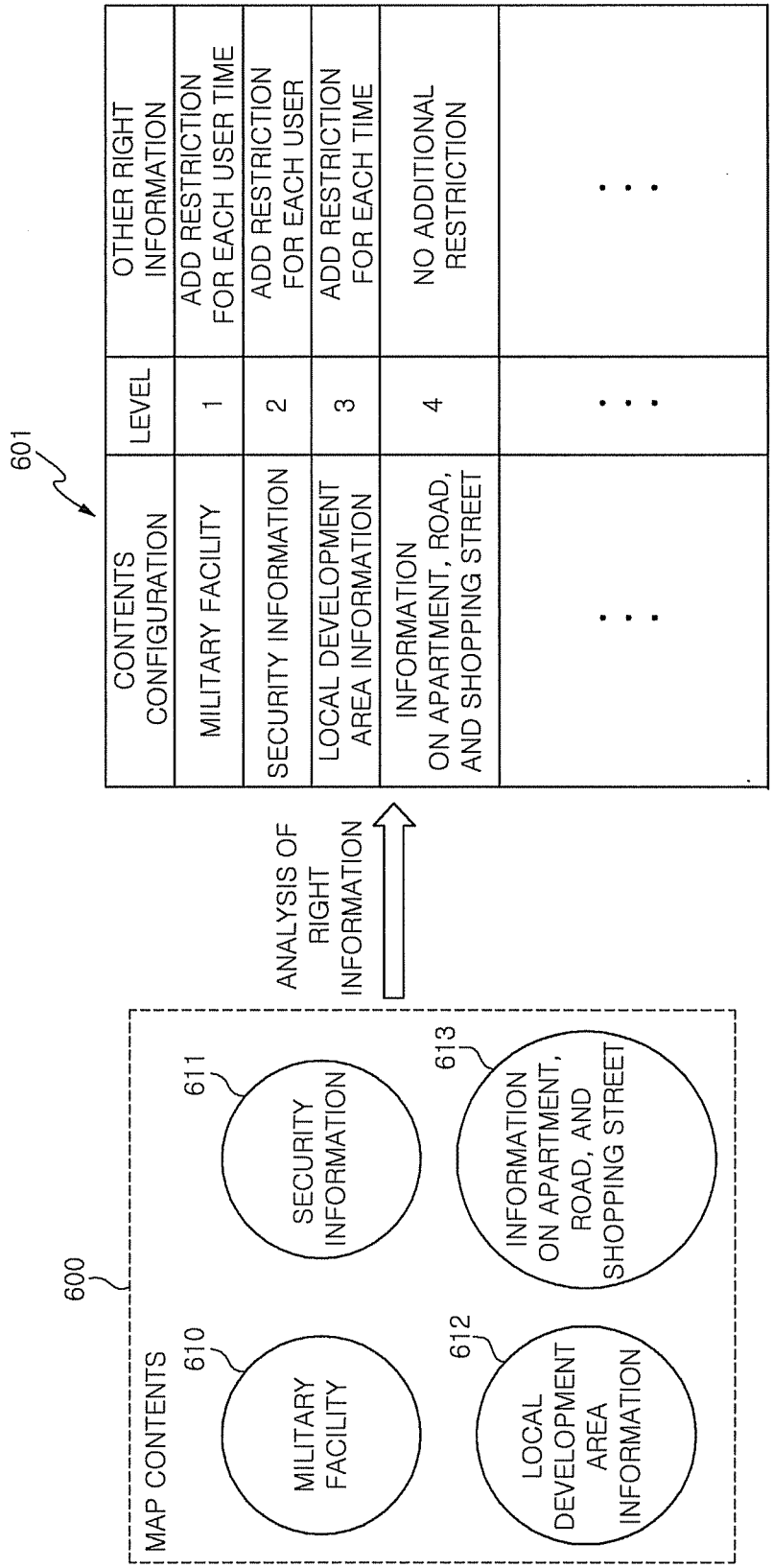
FIG. 6 shows an example of level classification for each component of contents for map contents among digital contents.
Figure 7:
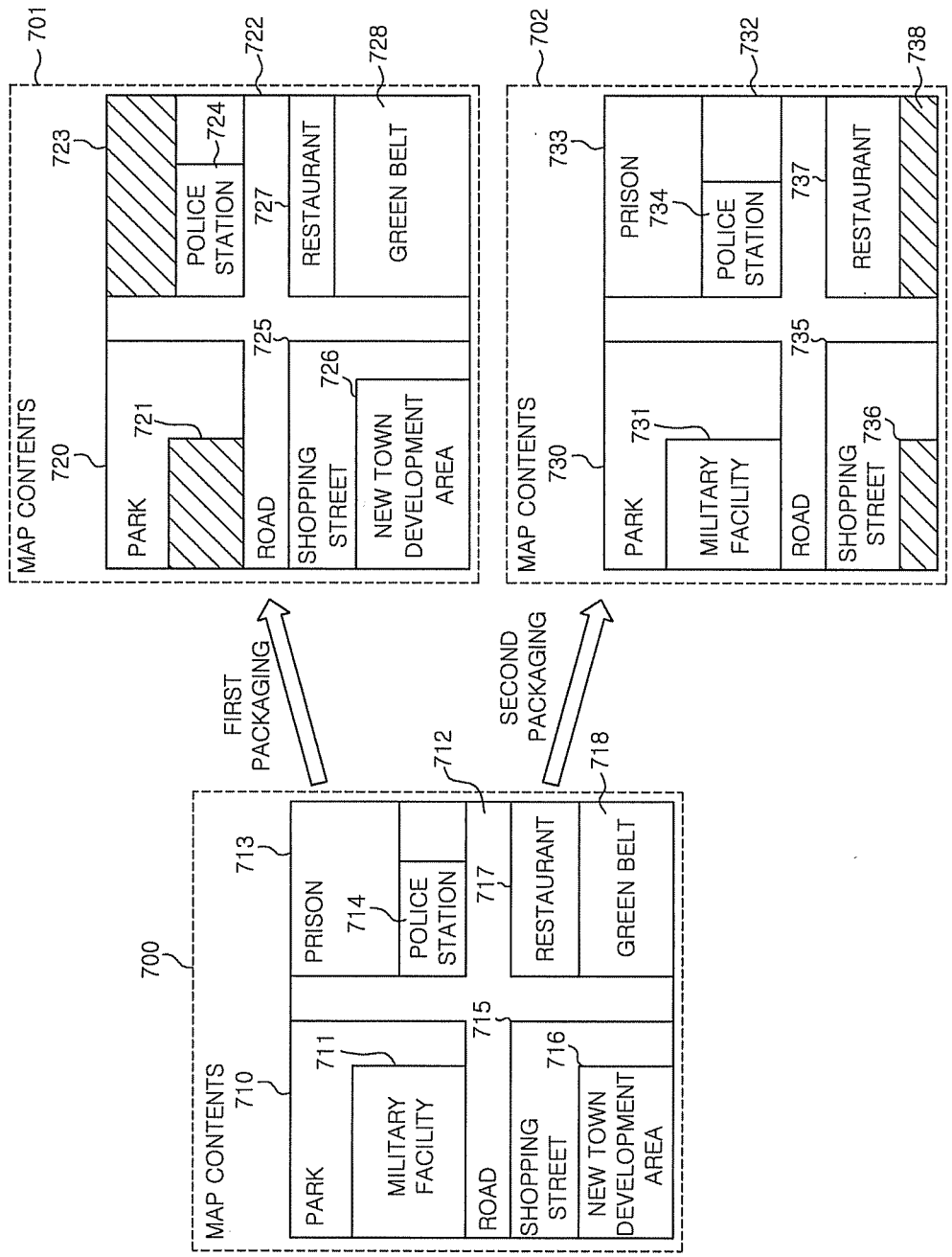
FIG. 7 shows an example of packaging for each component of contents by an apparatus and a method for right management of digital contents according to an embodiment of the present invention.

In the case of the packaged digital contents created by the contents creating unit 501, the usage right information may also be stored in a header (data components in which the digital contents information including creation time, date, code, a file name, etc. is recorded) of the digital contents data. Further, even in the case of some of details of a contents file, the usage right information may be stored in a header of each contents file. FIGS. 6 and 7 schematically show an example in which a technology related to the usage right of the digital contents is applied to some of the details of the contents file.

First, referring to FIG. 6, a structure (600) of map image contents according to an embodiment of the present invention is shown. The structure 600 of the map image contents may include a military facility 610, security information 611, information 612 on a local development area, and information 613 on general areas including an apartment, a road, a shopping street, etc. In the structure of the map image contents, the contents analyzing unit 502 analyzes the map image contents for each component and combines the components corresponding to the usage right information of the map image contents to package the map image contents. Referring to a schematic structure 601 based on the data for the packaged map image contents, the components constituting the contents 610, 611, 612, and 613 are classified into plural levels, that is, levels 1 to 4 and a criterion for classifying the level depends on spatial information in the embodiment of the present invention and other usage right data includes an additional usage limit or not related to the user, the time, etc., but another usage right is used as a main component that classifies the level or plural right information is used as the limit component at once and no one component for mainly classifying the level is provided.

FIG. 7 schematically an image for packaging the map image contents described in FIG. 6.

Referring to FIG. 7, the map image contents 700 which is the packaging target include constituent components such as a park 710, a military facility 711, a road 712, a prison 713, a police station 714, a shopping street 715, a new town development area 716, a restaurant 717, and a green belt 718. When the map image contents 700 are packaged through image analysis and combination with the right information by the contents packaging unit, downloadable components depend on the usage right as shown in examples of a first packaging image 701 and a second packaging image 702. In the first packaging image 701, components corresponding to a military facility 721 and a prison 723 are marked by slant lines and not shown for a space and a user that should restrict military and security information (all methods to disable the information to be shown are available) and in the second packaging image 702, economical information should be restricted, but a new town development area 736 and a green belt 738 are not shown by being marked with the slant lines for a space, a time, a user that can use a map for a military purpose. Through diversification of contents packaging for each right information, since the digital right management system can be applied to all or some of the contents, applicability of the digital right management technology will be extended.

Figure 8:
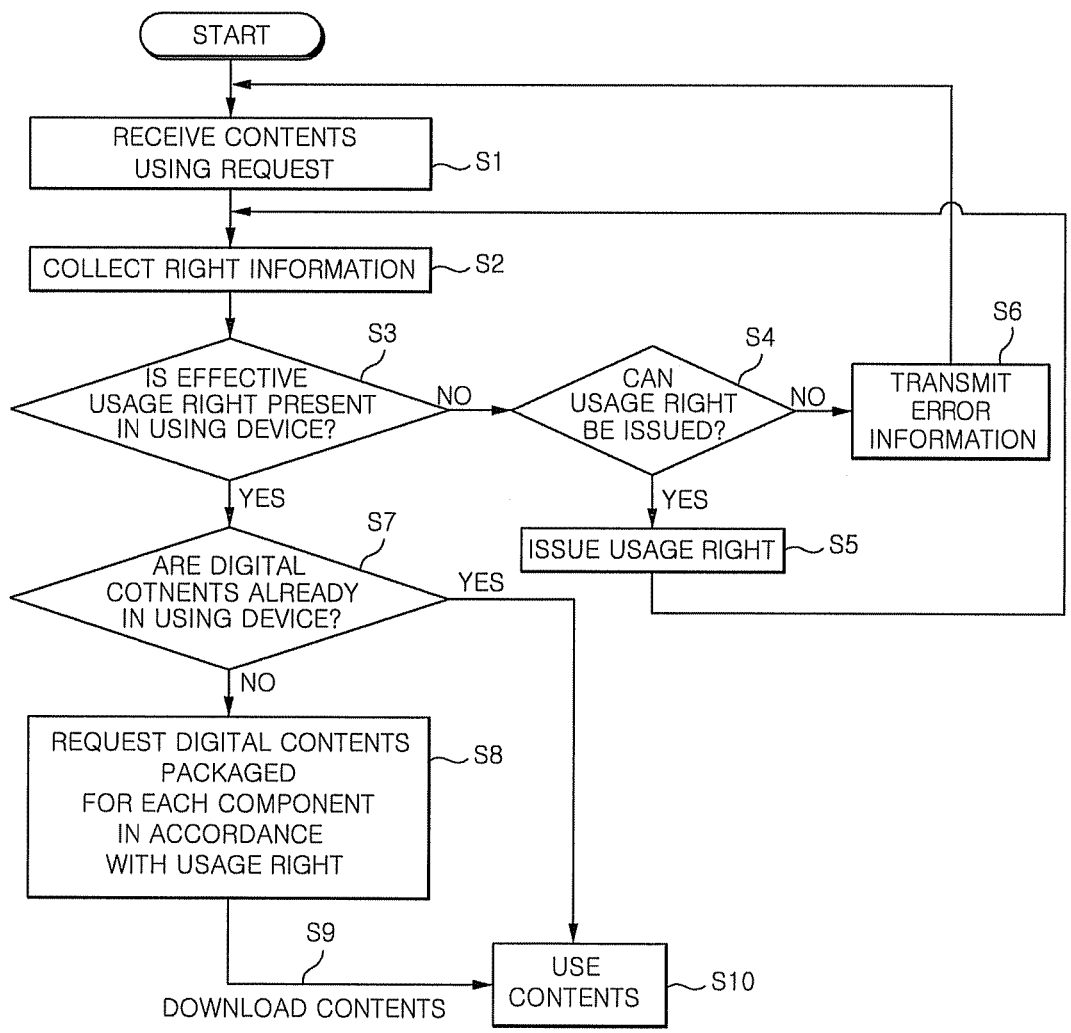
FIG. 8 shows a flowchart of a method for right management of digital contents according to an embodiment of the present invention.

FIG. 8 is a schematic flowchart of an embodiment of a method for right management of digital contents by using an apparatus for right management of digital contents according to the present invention. The apparatus which can implement the embodiment of the method for right management of the digital contents shown in FIG. 8 may include all apparatuses that can provide the same effect in addition to the embodiment.

Referring to FIG. 8, step S1 is performed at which the contents manager 102 and the digital right manager 101 receive a request for using the digital contents through the content using device 103 of a user who wants to use the digital contents. In this case, step S2 is performed at which the digital right manager 101 collects information related to a plurality of usage rights of digital contents including the time, space, user information, etc. according to the requests of the contents using device 103 and the user' request through the external digital right information collector 303 and the right information collector 300.

Thereafter, step S3 is performed at which the right controller 302 judges whether or not the effective usage right of the digital contents is already issued in the contents using device 103. If the usage right is not issued, step S4 is performed at which the right controller 302 judges whether or not the usage right can be issued in the contents using device 103 based on information on the collected usage right and step S5 is performed at which the usage right is issued in the contents using device 103 when the usage right can be issued. Thereafter, the process returns to the information collecting step S2 again. If the usage right cannot be issued, step S6 of transmitting error information to the contents using device 103 is performed.

In the state where the usage right of the digital contents available for the contents using device 103 is issued, the contents providing unit 402 performs step S7 of judging whether or not the digital contents packaged for each component of the contents are already present in the contents using device 103 on the basis of the usage right. In the state where the already packaged digital contents are provided, step S10 of using the packaged digital contents in accordance with the usage right or using the packaged digital contents by deleting or adding some components is performed.

In the state where the packaged digital contents are not provided to the contents using device 103, the contents providing unit 402 performs step S8 of requesting download in accordance with the usage right of the digital contents to the contents storing unit 102 or the contents packing unit 401 with respect to the digital contents packaged for each component of the contents by the contents manager 101, and steps S9 and S10 of using the digital contents by transmitting the digital contents to the contents using device 103 are performed. Thereafter, returning to step S2, the information on the usage right of the digital contents for the contents using device 103 is continuously received and the effective usage right for the digital contents is managed in real time.

An apparatus and a method for right management of digital contents according to an embodiment of the present invention is not just one example of the present invention disclosed in the appended claims and it is apparent that the appended claims is not limited. Further, it will be apparent that the equivalent invention which can achieve the same effect as the present invention is also the same as the present invention.

What is claimed is:

1. An apparatus for right management of digital contents, comprising:
    a digital right manager to create a usage right of digital contents on the basis of received right information; and
    a contents manager to provide the digital contents in accordance with the created usage right,
    wherein the contents manager includes:
    a contents packing unit to receive the usage right created from the digital right manager, and extracts and packages components of the digital contents in accordance with the usage right covering the components of the digital contents, and
    a contents providing unit to receive packaged digital contents created from the contents packaging unit and provides the packaged digital contents to a contents using device,
    wherein the components of the digital contents are classified for each level of levels in accordance with the usage right,
    wherein right information level includes spatial information alone or the spatial information and time information or the spatial information and user information or the spatial information, the time information and the user information, with the spatial information being required for establishing a usage right for all or some components of the digital contents,
    wherein the digital contents are spatial information contents and components of the spatial information contents correspond to characteristics of each building of a space.

2. The apparatus for right management of digital contents according to claim 1, wherein the digital contents include at least one of media of an image, an audio, a text, a moving picture multimedia file, and a computer-readable program.

3. The apparatus for right management of digital contents according to claim 1, wherein the digital right manager includes an internal right information collector to receive the right information from an external right information collector.

4. The apparatus for right management of digital contents according to claim 1, wherein the digital right manager includes a right information collector to receive the right information from the contents using device.

5. The apparatus for right management of digital contents according to claim 1, wherein the digital right manager includes a right controller to provide the created usage right to the contents manager or the contents using device.

6. The apparatus for right management of digital contents according to claim 1, further comprising:
    a contents storing unit includes a digital contents storing unit storing the digital contents which are a target of packaging and a packaging contents storing unit storing the packaged digital contents.

7. The apparatus for right management of digital contents according to claim 1, wherein the contents providing unit further includes judging whether or not a usage right available for the packaged digital contents is present in the contents using device.

8. The apparatus for right management of digital contents according to claim 1, wherein the contents providing unit further includes judging whether or not to provide the packaged digital contents to the contents using device by judging whether or not the packaged digital contents are already present in the contents using device.

9. A method for right management of digital contents using an apparatus for right management of digital contents including a digital right manager that creates a usage right of digital contents on the basis of received right information and a contents manager that provides the digital contents in accordance with the created usage right covering the components of the digital contents, comprising:
    allowing the digital right manager to collect usage right information of the digital contents and create the usage right of the digital contents on the basis of the usage right information of the digital contents; and
    allowing the contents manager to extract and package components of the digital contents on the basis of the usage right and provide the packaged digital contents to a contents using device,
    wherein the components of the digital contents are classified for each level of levels in accordance with the usage right,
    wherein right information level includes spatial information alone or the spatial information and time information or the spatial information and user information or the spatial information, the time information and the user information, with the spatial information being required for establishing a usage right for all or some components of the digital contents,
    wherein the digital contents are spatial information contents and components of the spatial information contents correspond to characteristics of each building of a space.

10. The method for right management of digital contents according to claim 9, wherein the digital contents include at least one of media of an image, audio, a text, a moving picture multimedia file, and a computer-readable program.

11. The method for right management of digital contents according to claim 9, further comprising:
   allowing the digital right manger to collect the right information in order to create the usage right.

12. The method for right management of digital contents according to claim 9, further comprising:
   storing the digital contents packaged by the contents manager in a digital contents storing unit.

13. The method for right management of digital contents according to claim 9, further comprising:
   allowing the contents manager to judge whether or not usage right available for the packaged digital contents is present in the contents using device.

14. The method for right management of digital contents according to claim 9, further comprising:
   allowing the contents manager to judge whether or not to provide the packaged digital contents to the contents using device by judging whether or not the packaged digital contents are already present in the contents using device.

* * * * *